US012770043B2

(12) United States Patent
Griffin et al.

(10) Patent No.: US 12,770,043 B2
(45) Date of Patent: Oct. 20, 2026

(54) QUANTUM SYSTEM OPERATING SYSTEM SERVICE ORCHESTRATION

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 882 days.

(21) Appl. No.: 18/160,844

(22) Filed: Jan. 27, 2023

(65) Prior Publication Data

US 2024/0256931 A1 Aug. 1, 2024

(51) Int. Cl.
*G06N 10/20* (2022.01)

(52) U.S. Cl.
CPC .................................... *G06N 10/20* (2022.01)

(58) Field of Classification Search
CPC ......... G06N 10/20; G06N 10/00; G06N 10/80
See application file for complete search history.

(56) References Cited

U.S. PATENT DOCUMENTS 10,996,979 B2 * 5/2021 Bishop .................. G06F 9/4843
2010/0293380 A1 * 11/2010 Wiseman .............. H04L 9/0852 713/169
2018/0365585 A1 * 12/2018 Smith ..................... G06F 9/546
2018/0367309 A1 * 12/2018 Reinhold .............. H04L 9/0662
2020/0351087 A1 * 11/2020 Mccandlish .............. G06F 1/28
2021/0157662 A1 * 5/2021 Heckey ................. G06F 9/5072
2021/0279625 A1 * 9/2021 Shani ..................... G06N 10/40
2021/0374583 A1 12/2021 Griffin et al.
2021/0406752 A1 12/2021 Smith et al.
2022/0156627 A1 * 5/2022 Kim ........................ G06F 8/425 706/62
2022/0188686 A1 6/2022 Richardson et al.
2023/0099621 A1 * 3/2023 Shi ......................... G06N 10/80

OTHER PUBLICATIONS

Author Unknown, "Orange Quantum Systems—Products," https://orangeqs.com/#/products, date of download: Sep. 15, 2022, 2 pages.

* cited by examiner

*Primary Examiner* — Phenuel S Salomon
(74) *Attorney, Agent, or Firm* — Dority & Manning, P.A.

(57) ABSTRACT

A quantum instruction file (QIF) comprising programming instructions operable to manipulate a qubit is obtained. Real-time environmental metrics of each respective quantum computing system (QCS) of a plurality of QCSs are obtained. Based on the real-time environmental metrics it is determined that a first operating system service (OSS) implemented by an operating system (OS) of a first QCS of the plurality of QCSs is to be utilized for an execution cycle of the QIF, and a second OSS implemented by an OS of a second QCS of the plurality of QCSs is to be utilized for the execution cycle of the QIF. A QIF execution record, indicating that the first OSS and the second OSS are to be utilized for the execution cycle of the QIF, is generated. The first QCS and the second QCS are notified of the generation of the QIF execution record.

20 Claims, 11 Drawing Sheets

QUANTUM SYSTEM OPERATING SYSTEM SERVICE ORCHESTRATION

BACKGROUND

Quantum computing involves the use of quantum bits, referred to herein as "qubits," which have characteristics that differ from those of classical (i.e., non-quantum) bits used in classical computing. Qubits may be employed by quantum processes that are executed by quantum computing systems. Quantum computing operating systems provide operating system services to manage and facilitate the execution cycle of a quantum process.

SUMMARY

The examples disclosed herein implement a quantum system orchestrator service (QSOS) that, prior to or at the beginning of an execution cycle of a quantum instruction file (QIF) that comprises quantum instructions, allocates operating system services (OSSs) from quantum computing systems (QCSs) in a group of QCSs to manage the execution cycle of the QIF based on various criteria, such as real-time environmental factors of the QCSs and on resources needed by the QIFs.

In one example a method is provided. The method includes obtaining, by a computing device, a first quantum instruction file (QIF) comprising programming instructions operable to manipulate a qubit. The method further includes obtaining, by the computing device from each respective quantum computing system (QCS) of a plurality of QCSs communicatively coupled to one another, real-time environmental metrics of the respective QCS. The method further includes determining, by the computing device based on the real-time environmental metrics, that a first operating system service (OSS) implemented by an operating system (OS) of a first QCS of the plurality of QCSs is to be utilized for an execution cycle of the first QIF, and a second OSS implemented by an OS of a second QCS of the plurality of QCSs is to be utilized for the execution cycle of the first QIF. The method further includes generating, by the computing device, a first QIF execution record that indicates that the first OSS and the second OSS are to be utilized for the execution cycle of the first QIF. The method further includes causing, by the computing device, the first QCS and the second QCS to be notified of the generation of the first QIF execution record.

In another example a computing device is provided. The computing device includes a memory, and a processor device coupled to the memory. The processor device is to obtain a first quantum instruction file (QIF) comprising programming instructions operable to manipulate a qubit. The processor device is further to obtain, from each respective quantum computing system (QCS) of a plurality of QCSs communicatively coupled to one another, real-time environmental metrics of the respective QCS. The processor device is further to determine, based on the real-time environmental metrics, that a first operating system service (OSS) implemented by an operating system (OS) of a first QCS of the plurality of QCSs is to be utilized for an execution cycle of the first QIF, and a second OSS implemented by an OS of a second QCS of the plurality of QCSs is to be utilized for the execution cycle of the first QIF. The processor device is further to generate a first QIF execution record that indicates that the first OSS and the second OSS are to be utilized for the execution cycle of the first QIF. The processor device is further to cause the first QCS and the second QCS to be notified of the generation of the first QIF execution record.

In another example a non-transitory computer-readable storage medium is provided. The non-transitory computer-readable storage medium includes executable instructions to cause a processor device to obtain a first quantum instruction file (QIF) comprising programming instructions operable to manipulate a qubit. The instructions further cause the processor device to obtain, from each respective quantum computing system (QCS) of a plurality of QCSs communicatively coupled to one another, real-time environmental metrics of the respective QCS. The instructions further cause the processor device to determine, based on the real-time environmental metrics, that a first operating system service (OSS) implemented by an operating system (OS) of a first QCS of the plurality of QCSs is to be utilized for an execution cycle of the first QIF, and a second OSS implemented by an OS of a second QCS of the plurality of QCSs is to be utilized for the execution cycle of the first QIF. The instructions further cause the processor device to generate a first QIF execution record that indicates that the first OSS and the second OSS are to be utilized for the execution cycle of the first QIF. The instructions further cause the processor device to cause the first QCS and the second QCS to be notified of the generation of the first QIF execution record.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
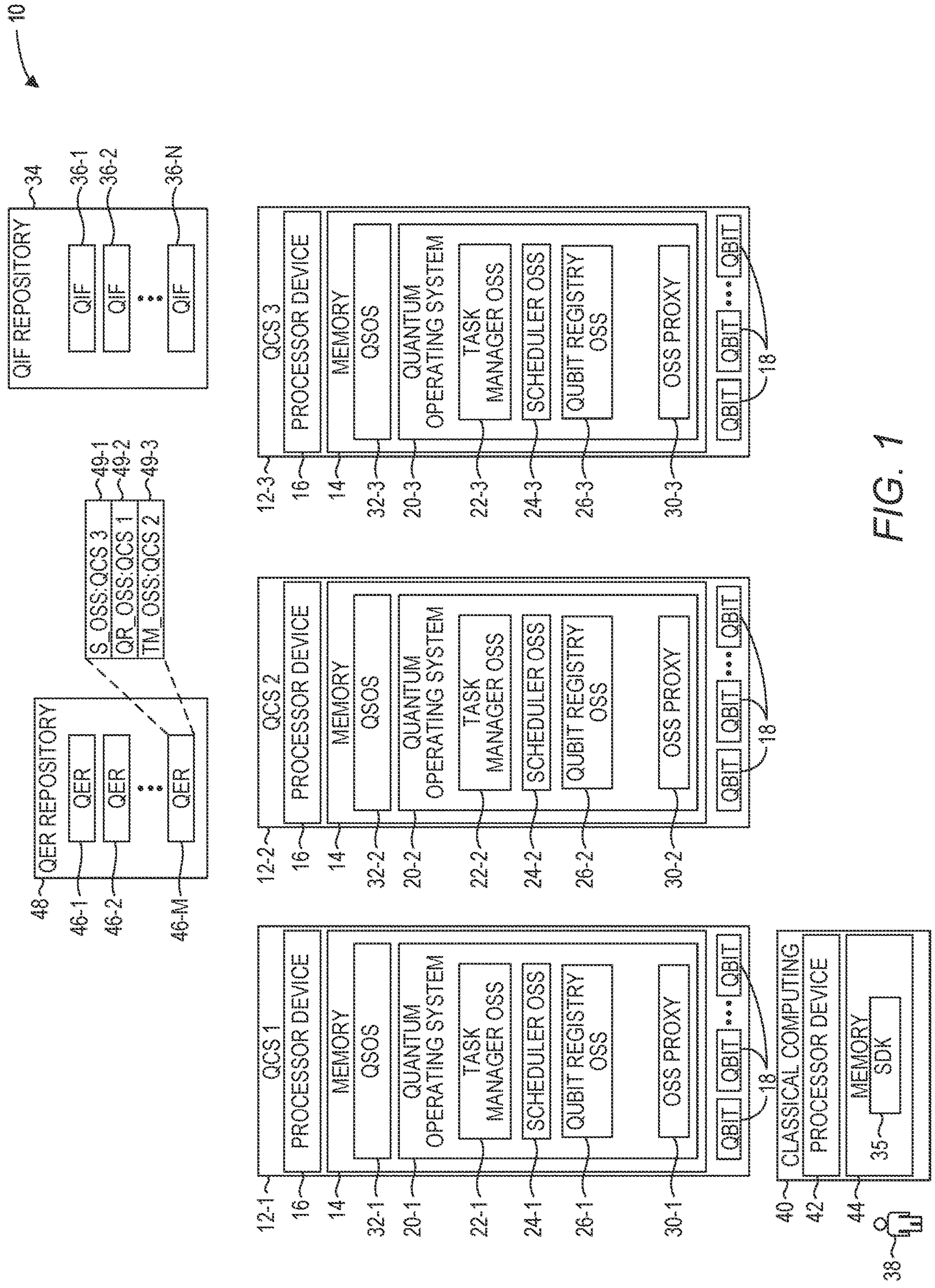
FIG. 1 is a block diagram of an environment in which quantum system operating system service orchestration can be implemented according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Quantum computing involves the use of quantum bits, referred to herein as "qubits," which have characteristics that differ from those of classical (i.e., non-quantum) bits used in classical computing. Qubits may be employed by quantum processes that are executed by quantum computing systems (QCSs). Quantum computing system operating systems include operating system services (OSSs), such as kernel-level or otherwise privileged non-user space services to manage and facilitate the execution cycle of quantum processes executing or to be executed on the respective QCSs. Groups of quantum computing systems may be communicatively coupled to one another via high-speed communication channels to facilitate near-instantaneous data transfer, and via quantum communication channels via which qubits can be sent from one quantum computing system to another. OSSs of the group of quantum computing systems may be at times unevenly loaded such that a particular OSS of one QCS is unable to keep up with a current demand, resulting in delayed processing, while the same OSS on another QCS may be underutilized. If the OSSs of the group of QCSs could operate to provide the respective service to a quantum process irrespective of which QCS the quantum process is to be initiated on, and do so in a manner that is transparent to the quantum process to eliminate a need to re-engineer the quantum process, the group of QCSs could ensure that OSSs are relatively evenly loaded, thereby increasing the throughput of the QCSs as a whole.

The examples disclosed herein implement a quantum system orchestrator service (QSOS) that, prior to or at the beginning of an execution cycle of a quantum instruction file (QIF) that comprises quantum instructions, allocates OSSs from QCSs in a group of QCSs to manage the execution cycle of the QIF based on various criteria, such as real-time environmental factors of the QCSs and on resources needed by the QIFs. The determined OSS allocation is stored in a QIF execution record and is available to each QCS such that the OSSs of the QCSs are aware of which QIF execution cycles the OSSs are to service.

FIG. 1 is a block diagram of an environment 10 in which quantum system operating system service orchestration can be implemented according to one example. The environment 10 includes a group of QCSs 12-1-12-3 (generally, QCSs 12). The QCSs 12 each include a system memory 14, a processor device 16, and each QCS 12 implements a plurality of qubits 18. The QCSs 12 are communicatively coupled to one another via high-speed communication channels to facilitate near-instantaneous data transfer, and via quantum communication channels via which qubits can be sent from one QCS 12 to another. It is to be understood that the environment 10, in practice, may include more QCSs 12 than illustrated in FIG. 1. Additionally, the QCSs 12 in some examples may include constituent elements in addition to those illustrated in FIG. 1.

The QCSs 12 operate in quantum environments, but are each capable of operating using classical computing principles or quantum computing principles. When using quantum computing principles, the QCSs 12 perform computations that utilize quantum-mechanical phenomena, such as superposition and/or entanglement states. The QCSs 12 may operate under certain environmental conditions, such as at or near zero degrees (0°) Kelvin. When using classical computing principles, the QCSs 12 utilize binary digits that have a value of either zero (0) or one (1).

Each QCS 12-1-12-3 includes a corresponding quantum operating system (OS) 20-1-20-3 operable to initiate quantum processes that manipulate qubits 18, and operable to perform other operating system functions, such as process management, multi-tasking, memory management, file management, device management, and the like. The quantum OS 20-1 includes a variety of operating system services (OSSs), including, by way of non-limiting example, a task manager OSS 22-1, a scheduler OSS 24-1, and a qubit registry OSS 26-1.

The task manager OSS 22-1 handles operations for creating, monitoring, and terminating quantum processes on the QCS 12-1. As will be described in greater detail herein, the task manager OSS 22-1 may ensure resources needed by a quantum process, such as qubits and/or external processes that will be invoked by the quantum process, are also available for the quantum process.

The scheduler OSS 24-1 of the QCS 12-1 controls the scheduling of a quantum process for initiation by a task manager OSS 22 of a QCS 12. The scheduler OSS 24-1 may ensure, prior to causing the initiation of a quantum process by a task manager OSS 22 that the QCS 12 on which the quantum process is to execute is environmentally to execute the quantum process. The scheduler OSS 24-1 may also ensure that, if the quantum process is to be initiated upon the occurrence of some condition, such as in response to some event or at a predetermined time or date, that such predetermined condition has occurred.

The qubit registry OSS 26-1 maintains and provides access to data relating to the qubits 18 implemented by the QCS 12-1, and in a federated implementation, those qubits 18 implemented by the QCSs 12-2 and 12-3, including a count of the total number of qubits 18 implemented by the QCSs 12, and a count of the number of available qubits that are currently available for allocation by the QCSs 12. The qubit registry OSS 26-1 maintains a qubit registry entry for each such qubit 18 implemented by any of the QCSs 12. The qubit registry entry comprises metadata for each such qubit 18, such as, by way of non-limiting example, an identifier of the corresponding qubit 18, an address of the corresponding qubit 18, an availability indicator that indicates whether the corresponding qubit 18 is available for use or is in use by a specific quantum process, an identifier of a quantum process that is associated with the corresponding qubit 18 or to which the corresponding qubit 18 is allocated, and/or an entanglement indicator that indicates whether the corresponding qubit 18 is in an entangled state.

The quantum OS 20-1 also includes an OSS proxy 30-1 that operates to, as will be explained in greater detail below, intercept requests made by a quantum process to a specific OSS and determines the QCS 12 to which the request should be directed. The QCS 12-1 implements a QSOS 32-1 that operates, as described in greater detail herein, to allocate OSSs to service an execution cycle of a quantum instruction file (QIF). The term "execution cycle" in this context refers to the period of time and events including and between the identification of a QIF for initiation to the termination of a quantum process initiated from the QIF.

The QCSs 12-2 and 12-3 include quantum OSs 20-2 and 20-3, respectively, task manager OSSs 22-2 and 22-3, respectively, scheduler OSSs 24-2 and 24-3, respectively, qubit registry OSSs 26-2 and 26-3, respectively, miscellaneous OSSs 28-2 and 28-3, respectively, OSS proxies 30-2 and 30-3, respectively, and QSOSs 32-2 and 32-3, respectively, each of which operates substantially similarly to the corresponding components of the QCS 12-1, as discussed above.

In some implementations, the environment 10 includes a quantum instruction file (QIF) repository 34 that stores a plurality of quantum instruction files (QIFs) 36-1-36-N (generally, QIFs 36) that contain quantum programming instructions configured to manipulate the qubits 18. The QIFs 36 may be written in any suitable quantum programming language, such as, by way of non-limiting example, Qiskit, QCL, cQASM, Quil, and the like.

An example of quantum system operating system service orchestration will now be presented. In this example, a user 38 interacts with a classical computing device 40 that includes a processor device 42 and a memory 44. In particular, the user 38 interacts with a software development kit (SDK) 35 to develop a QIF 36-N, which comprises quantum programming instructions operable to manipulate a qubit via suitable quantum operation(s). The user 38 stores the QIF 36-N in the QIF repository 34 and submits an instruction to the computing device 40 to execute the QIF 36-N. The computing device 40 is communicatively coupled to the QCS 12-1. The computing device 40 may or may not be communicatively coupled to the QCSs 12-2 and 12-3. The computing device 40 sends an instruction to the QCS 12-1 to initiate the QIF 36-N. The instruction may include information that identifies the location of the QIF 36-N in the repository 34 or may actually include the QIF 36-N.

The QSOS 32-1 receives the instruction and obtains the QIF 36-N, either by receiving the QIF 36-N along with the instruction or by obtaining the QIF 36-N from the QIF repository 34. The QSOS 32-1 obtains real-time environmental metrics of the QCSs 12-1, 12-2 and 12-3. The QSOS 32-1 may access OS services of the QCS 12-1 to obtain the real-time environmental metrics of the QCS 12-1, and may send requests to the QCSs 12-2 and 12-3 for the real-time environmental metrics of the respective QCSs 12-2 and 12-3. The real-time environmental metrics may include, by way of non-limiting example, one or more of a number of available qubits 18 on each respective QCS 12, a current temperature profile of each respective QCS 12, a current noise profile of each respective QCS 12, a type of qubit 18 implemented by each respective QCS 12, an error correction service offered by each respective QCS 12, a processor utilization of each respective QCS 12, a memory utilization of each respective QCS 12, a current load on the OSSs of the QCS 12 or the like. The current temperature profile of a QCS 12 is descriptive of real-time temperatures of one or more operating aspects of the QCS 12. A temperature profile may indicate that the temperature(s) of a QCS 12 are within a desired temperature range or are not within a desired temperature range. Similarly, a noise profile may indicate problems or a lack thereof of different potential sources of noise, such as environmental noise, crosstalk, decoherence, implementation errors, and the like.

The QSOS 32-1 determines, based at least in part on the real-time environmental metrics, that particular OSSs should be utilized for the execution cycle of the QIF 36-N. As an example, the QSOS 32-1 may determine that the scheduler OSS 24-3 of the QCS 12-3 should be used to provide the scheduler OSS, the qubit registry 26-1 of the QCS 12-1 should be used to provide the qubit registry OSS, and the task manager OSS 22-2 of the QCS 12-2 should be used to provide the task manager OSS service for execution cycle of the QIF 36-N. The QSOS 32-1 may make such determinations based on any desired conditions or criteria. As an example, the QSOS 32-1 may select the scheduler OSS 24-3 because, based on the environmental metrics, the QSOS 32-1 determines that the scheduler OSS 24-3 has fewer QIFs 36 scheduled for execution than the schedulers OSS 24-1 and 24-2. The QSOS 32-1 may select the task manager OSS 22-2 because, based on the environmental metrics, the QSOS 32-1 determines that the QCS 12-2 has a lower processor utilization than the QCSs 12-1 and 12-3, and/or because the QCS 12-2 has a preferable heat profile than those of the QCS 12-2 and 12-3. The QSOS 32-1 may select the task manager OSS 22-2 because, based on the environmental metrics, the QSOS 32-1 determines that the qubit registry 26-1 is receiving substantially fewer requests than the qubit registries 26-2 and 26-3. In some implementations, the QSOS 32-1 may also select a particular OSS based at least in part on an analysis of QIF execution records, as described below, and take into consideration the utilization of OSSs in the QIF execution records to ensure that the OSSs are relatively evenly represented in the QIF execution records assuming other environmental metrics are relatively equal. For example, the QSOS 32-1 may examine the QIF execution records and determine that the qubit registry 26-1 is underutilized in the QERs 46, and thus, assign the qubit registry 26-1 to service the execution cycle of the QIF 26-N.

The QSOS 32-1 generates a QIF execution record (QER) 46-M and stores the QIF execution record 46-M in a QER repository 48. The QER repository 48 comprises a plurality of QERs 46-1-46-M, each of which identifies the OSSs that have been designated by a QSOS 32 to service an execution cycle of a particular QIF 36. In this example, the QER 46-M includes a field 49-1 that indicates that the scheduler OSS 24-3 of the QCS 12-3 should be used to provide the scheduler OSS, a field 49-2 that indicates that the qubit registry 26-1 of the QCS 12-1 should be used to provide the qubit registry OSS, and a field 49-3 that indicates that the task manager OSS 22-2 should be used to provide the task manager OSS service.

The QSOS 32-1 causes the QCS 12-2 and QCS 12-3 to be notified of the generation of the QER 46-M. In some examples, simply storing the QER 46-M in the QER repository 48 causes the QER repository 48 to send the notification to the QCS 12-2 and the QCS 12-3. In other implementations the QSOS 32-1 may send a message to the QCS 12-2 and the QCS 12-3. In some implementations, the message may include the QER 46-M.

The QSOSs 32-2 and 32-3 may similarly be communicatively coupled to computing devices that submit QIFs 36 for execution. Upon receipt of a QIF 36, the QSOSs 32-2 and 32-3 perform a substantially similar process as discussed above with regard to the QSOS 32-1 to generate a corresponding QER 46 that identifies respective OSSs to service the execution cycle of the QIFs 36.

It is noted that, because the QSOS 32-1 is a component of the QCS 12-1, functionality implemented by the QSOS 32-1 may be attributed to the QCS 12-1 generally. Moreover, in examples where the QSOS 32-1 comprises software instructions that program the processor device 16 to carry out functionality discussed herein, functionality implemented by the QSOS 32-1 may attributed herein to the processor device 16.

In some implementations, in addition to the environmental metrics of the QCSs 12, the QSOS 26-1 may also take into consideration resources that will be needed by a quantum process that is initiated from the QIF 36-N when determining the particular OSS that will be used to service the QIF 36-N. For example, the QSOS 26-1 may determine that the quantum process will need a particular number of qubits, or that the quantum process will invoke a particular external process, such as another user process that is not part of the QIF 36-N. The QSOS 26-1 may utilize this information to determine a particular OSS of a particular QCS 12 to service the QIF 36-N, and may also store information in the QER 46-M that identifies the particular resource that will be needed for potential use by an OSS that is servicing the execution cycle of the QIF 36-N. For example, the QSOS 26-1 may determine that a particular QCS 12 has the external process executing already, and thus may assuming relative equality of other factors, allocate the task manager OSS 22 of such QCS 12 as the task manager OSS to service the QIF 36-N. As another example, the QSOS 26-1 may determine that the quantity of qubits needed by the quantum process are available only on a particular QCS 12, and thus may assuming relative equality of other factors, allocate the task manager OSS 22 of such QCS 12 as the task manager OSS to service the QIF 36-N.

In some implementations, the QSOS 26-1 may analyze the QIF 36-N, such as by parsing the QIF 36-N based on particular keywords that correspond to the particular quantum programming language of the instructions in the QIF 36-N. The QSOS 26-1 may then obtain, from each of the QCSs 12-1-12-3 resource information that identifies an availability status of resources of the respective QCSs 12-1-12-3, such as, by way of non-limiting example, the number of available qubits or a list of processes executing on the QCSs 12-1-12-3. Alternatively, such resource information may be included in the environmental information obtained from the QCSs 12-1-12-3.

As an example, the QSOS 32-1 may parse the QIF 36-N and determine that instructions in the QIF 36-N invoke an external process. The QSOS 32-1 may parse the QIF 36-N and also determine that the quantum process initiated from the QIF 36-N may utilize a determined quantity of qubits 18, such as five qubits 18 or 50 qubits 18.

In another implementation, the QSOS 32-1 may parse the QIF 36-N to identify a non-executable comment annotation that complies with a predetermined syntax and that identifies the resource that will be needed by the quantum process initiated from the QIF 36-N. In this implementation, the developer of the QIF 36-N would include in the QIF 36-N the particular non-executable comment annotation followed by the resource that will be needed, such as the number of qubits or an identifier of the external process.

Figure 2:
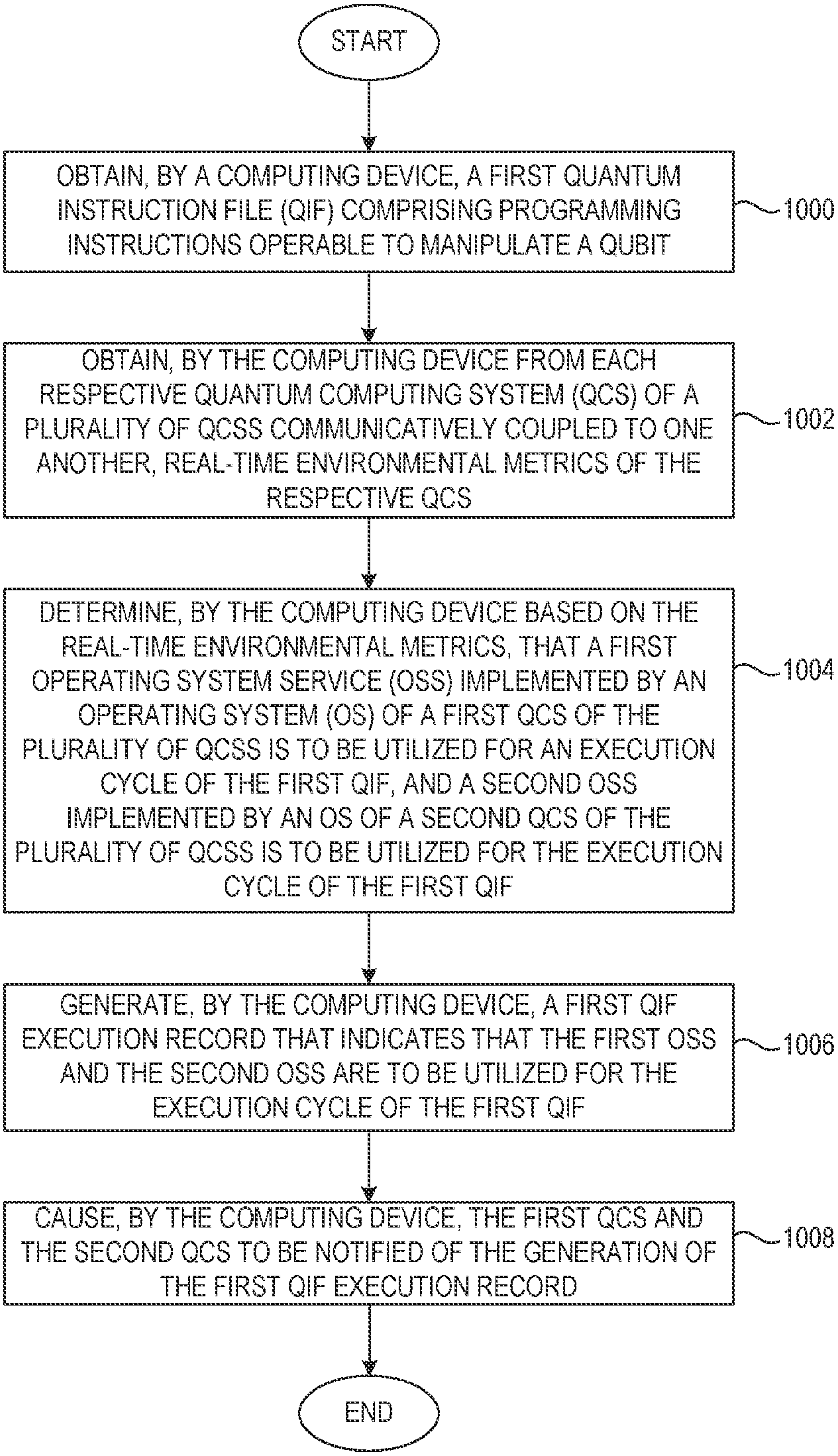
FIG. 2 is a method for implementing quantum system operating system service orchestration according to one example.

FIG. 2 is a flowchart of a method for implementing quantum system operating system service orchestration according to one example. FIG. 2 will be discussed in conjunction with FIG. 1. The QCS 12-1 obtains the QIF 36-N comprising programming instructions operable to manipulate a qubit 18 (FIG. 2, block 1000). The QCS 12-1 obtains, from each respective QCS 12 of the plurality of QCSs 12-1-12-3 communicatively coupled to one another, real-time environmental metrics of the respective QCS 12-1-12-3 (FIG. 2, block 1002).

The QCS 12-1 determines, based on the real-time environmental metrics, that a first OSS implemented by an OS of a first QCS 12 of the plurality of QCSs 12-1-12-3 is to be utilized for an execution cycle of the QIF 36-N, and a second OSS implemented by an OS of a second QCS 12 of the plurality of QCSs 12-1-12-3 is to be utilized for the execution cycle of the QIF 36-N (FIG. 2, block 1004). The QCS 12-1 generates the QIF execution record 46-M that indicates that the first OSS and the second OSS are to be utilized for the execution cycle of the QIF 36-N (FIG. 2, block 1006). The QCS 12-1 causes the first QCS 12 and the second QCS 12 to be notified of the generation of the QIF execution record 46-M (FIG. 2, block 1008).

Figure 3A:
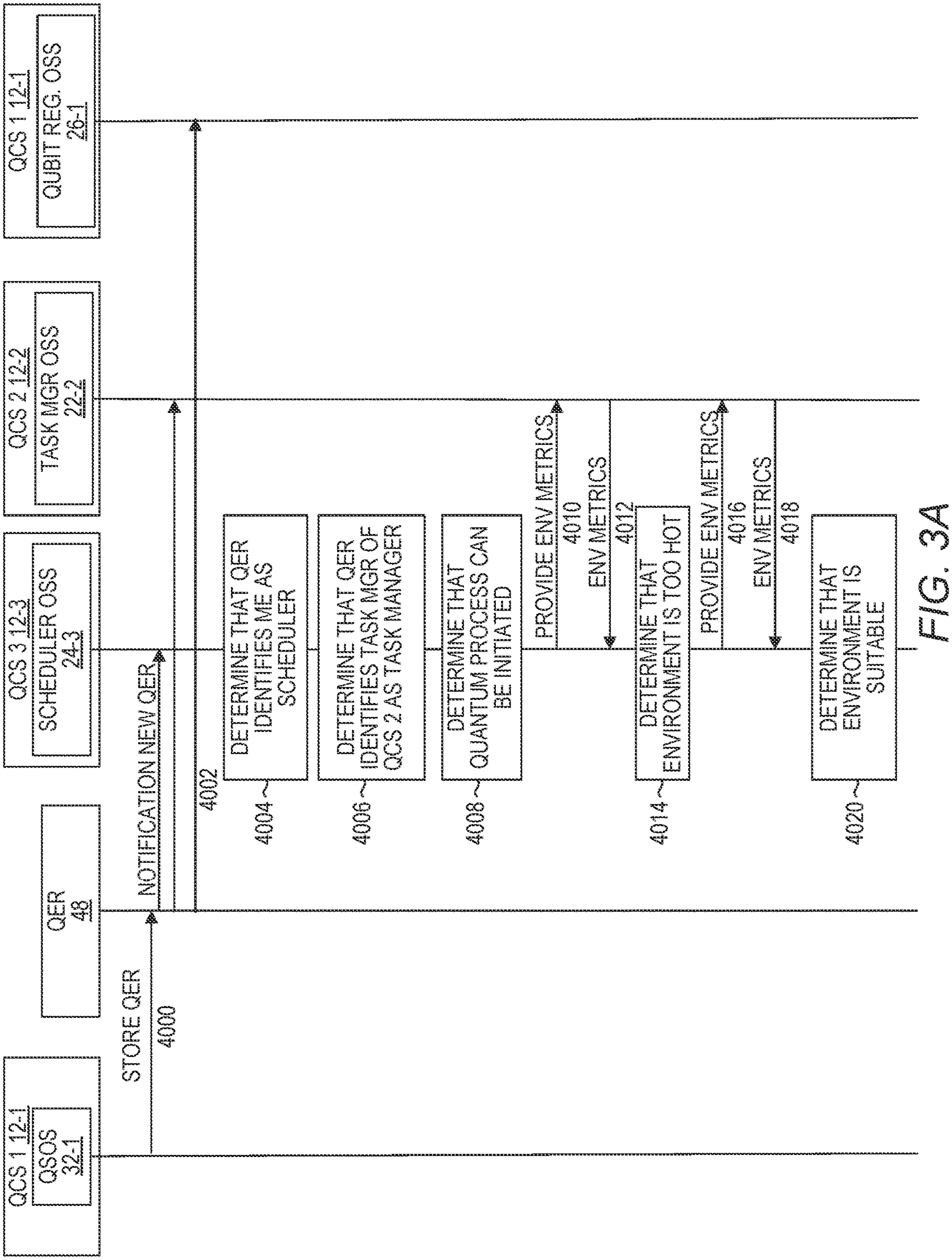
FIGS. 3A-3C illustrate a sequence diagram of messages between and actions taken by operating system services (OSSs) that have been allocated by a quantum system orchestrator service (QSOS) to manage the execution cycle of a quantum instruction file (QIF) according to one implementation.
Figure 3B:
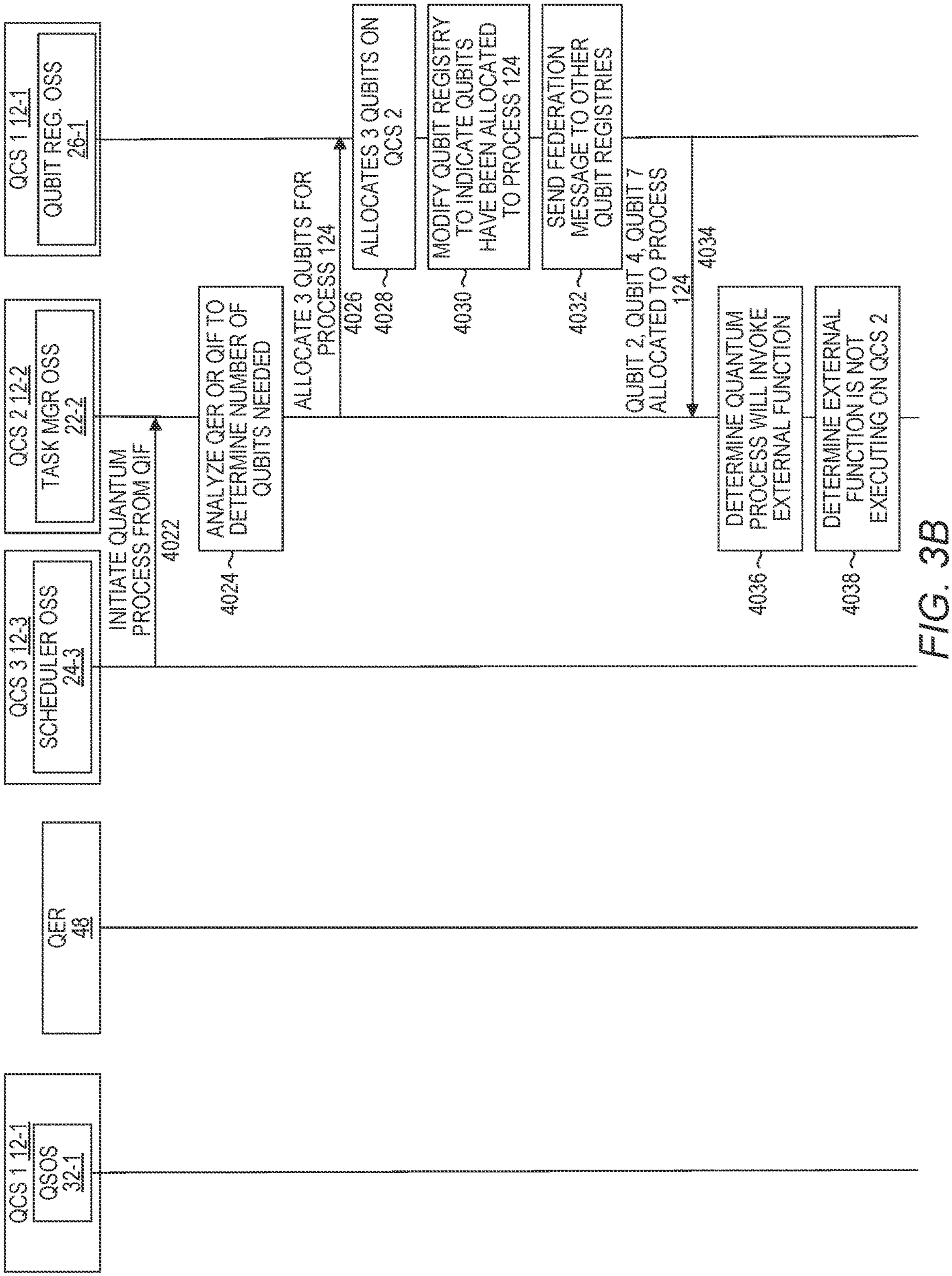
Figure 3C:
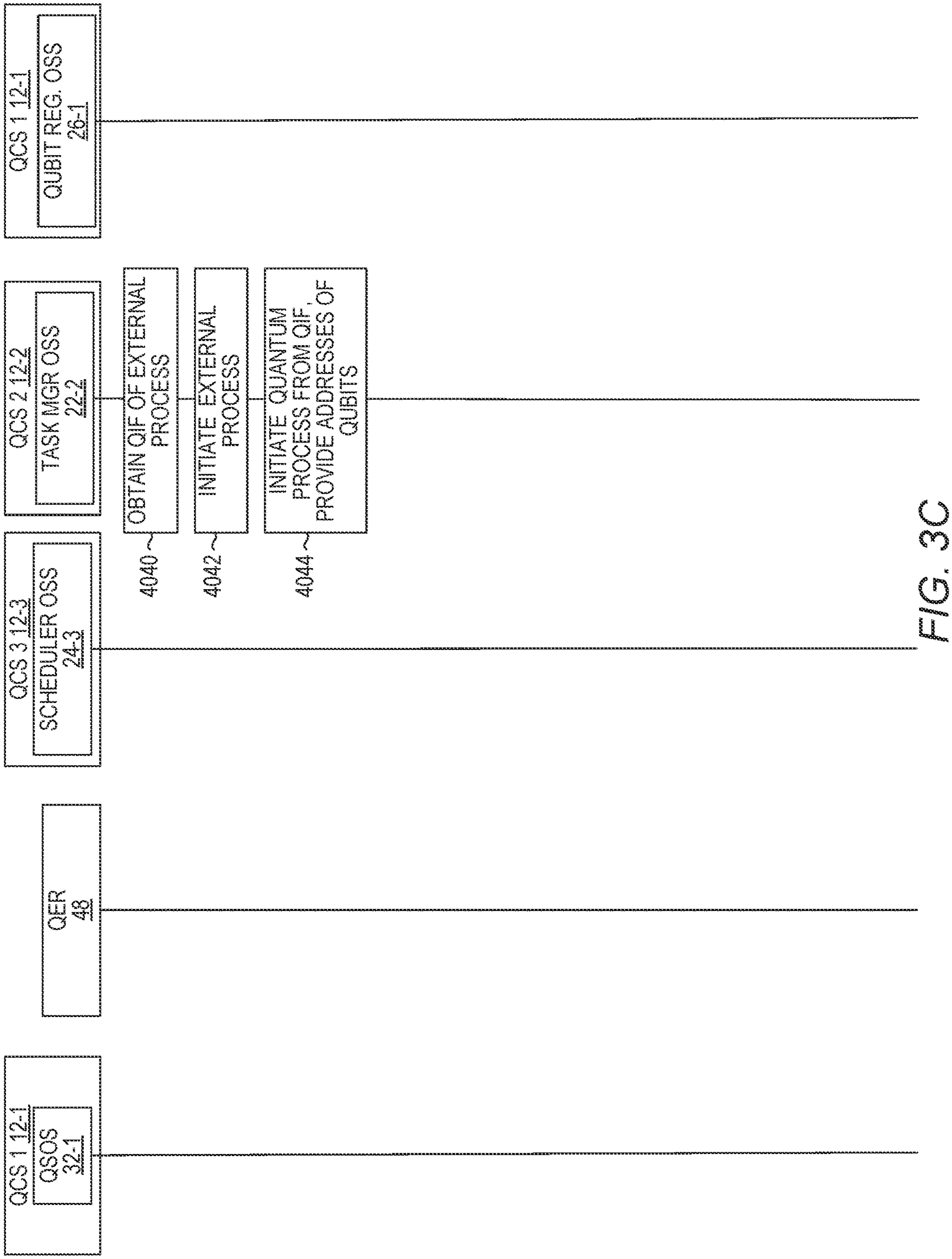

FIGS. 3A-3C illustrate a sequence diagram of messages between and actions taken by OSSs that have been allocated by a QSOS to manage the execution cycle of a QIF according to one implementation. Assume, for purposes of illustration, that, as discussed above with regard to FIG. 1, the QSOS 32-1 generates the QER 46-M and stores the QER 46-M in the QER repository 48 (FIG. 3A, step 4000). The QER repository 48 sends notifications of the QER 46-M to the QCSs 12-1-12-3 (FIG. 3A, step 4002). The scheduler OSS 24-3 determines, based on the QER 46-M, that the scheduler OSS 24-3 has been designated as the scheduler OSS for the execution cycle of the QIF 36-N (FIG. 3A, step 4004). The scheduler OSS 24-3 determines, based on the QER 46-M, that the task manager OSS 22-2 has been designated as the task manager OSS for the execution cycle of the QIF 36-N (FIG. 3A, step 4006). The scheduler OSS 24-3 determines, based on the QER 46-M, that there is no condition precedent to initiating a quantum process from the QIF 36-N, and thus that instructions to initiate a quantum process from the QIF 36-N can be sent to the task manager OSS 22-2 at any time (FIG. 3A, step 4008).

The scheduler OSS 24-3 sends a message to the task manager OSS 22-2 requesting environmental metrics of the QCS 12-2 (FIG. 3A, step 4010). The task manager OSS 22-2 obtains the environmental metrics and sends the environmental metrics to the scheduler OSS 24-3 (FIG. 3A, step 4012). The scheduler OSS 24-3 determines, based on the environmental metrics, that the QCS 12-2 is operating at a temperature above a desirable temperature range, and thus does not send a message to the task manager OSS 22-2 to initiate a quantum process from the QIF 36-N (FIG. 3A, step 4014).

At a later point in time, the scheduler OSS 24-3 again sends a message to the task manager OSS 22-2 requesting environmental metrics of the QCS 12-2 (FIG. 3A, step 4016). The task manager OSS 22-2 obtains the environmental metrics and sends the environmental metrics to the scheduler OSS 24-3 (FIG. 3A, step 4018). The scheduler OSS 24-3 determines, based on the environmental metrics, that the QCS 12-2 is operating within the desired temperature range (FIG. 3A, step 4020).

Referring now to FIG. 3B, the scheduler OSS 24-3 sends a message to the task manager OSS 22-2 to initiate a quantum process from the QIF 36-N (FIG. 3B, step 4022).

The task manager OSS 22-2 analyzes the QER 46-M and/or the QIF 36-N and determines that the quantum process will utilize three qubits 18 (FIG. 3B, step 4024). The task manager OSS 22-2 determines, based on the QER 46-M that the qubit registry OSS 26-1 has been designated as the qubit registry OSS for the execution cycle of the QIF 36-N. The task manager OSS 22-2 sends a request to the qubit registry OSS 26-1 for an allocation of three qubits for the quantum process (FIG. 3B, step 4026). The request may include a program identifier that will be assigned to the quantum process when the quantum process is initiated by the task manager OSS 22-2.

The qubit registry OSS 26-1 receives the request and allocates three qubits 18 that are implemented on the QCS 12-2 to the identified quantum process (FIG. 3B, step 4028). The qubit registry OSS 26-1 modifies the metadata maintained by the qubit registry OSS 26-1 to indicate that the three qubits are no longer available (FIG. 3B, step 4030). The qubit registry OSS 26-1 sends a message to the other qubit registry OSSs 26-2-26-3 so that such qubit registry OSSs can similarly update their corresponding metadata (FIG. 3B, step 4032). The qubit registry OSS 26-1 sends a message to the task manager OSS 22-2 that identifies, via qubit addresses, the three allocated qubits 18 (FIG. 3B, step 4034).

The task manager OSS 22-2 determines, based on the QER 46-M, that the quantum process will invoke an external service (FIG. 3B, step 4036). The task manager OSS 22-2 determines that the external service is not currently executing on the QCS 12-2 (FIG. 3B, step 4038).

Referring now to FIG. 3C, the task manager OSS 22-2 obtains the QIF associated with the external process (FIG. 3B, step 4040). The task manager OSS 22-2 initiates the external process (FIG. 3B, step 4042). The task manager OSS 22-2 then initiates the quantum process from the QIF 36-N and provides the addresses of the qubits allocated by the qubit registry OSS 26-1 to the quantum process (FIG. 3B, step 4044).

If the quantum process executing on the QCS 12-2 attempts to invoke a particular OSS, the OSS proxy 30-2 intercepts the invocation. The OSS proxy 30-2 accesses the QER 46-M and determines the QCS 12 on which the invoked OSS has been allocated to the quantum process. The OSS proxy 30-2 then sends the invocation to the OSS on the appropriate QCS 12. The OSS proxy 30-2 receives the response from the OSS, and then provides the response to the quantum process. In this manner, the quantum process need not be aware of what OSSs have been assigned to the quantum process.

Figure 4:
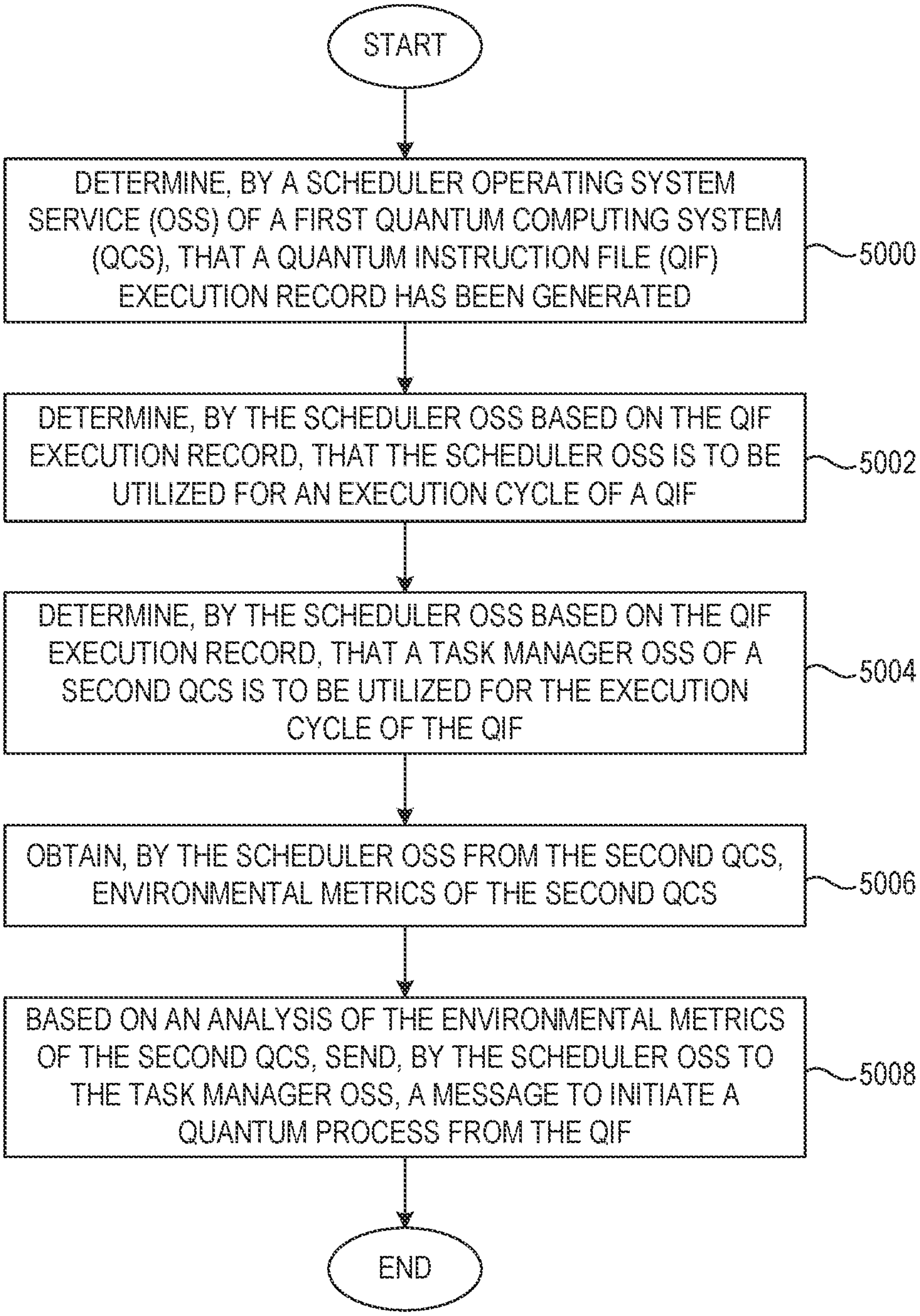
FIG. 4 is a flowchart of a method for a scheduler OSS according to one implementation.

FIG. 4 is a flowchart of a method for a scheduler OSS according to one implementation. FIG. 4 will be discussed in conjunction with FIGS. 3A—3C. The scheduler OSS 24-3 determines that the QER 46-M has been generated (FIG. 4, block 5000). The scheduler OSS 24-3 determines, based on the QER 46-M, that the scheduler OSS 24-3 is to be utilized for an execution cycle of the QIF 36-N (FIG. 4, block 5002). The scheduler OSS 24-3 determines, based on the QER 46-M, that the task manager OSS 22-2 of the QCS 12-2 is to be utilized for the execution cycle of the QIF 36-N (FIG. 4, block 5004). The scheduler OSS 24-3 obtains, from the QCS 12-2, environmental metrics of the QCS 12-2 (FIG. 4, block 5006). The scheduler OSS 24-3, based on an analysis of the environmental metrics of the QCS 12-2, sends, to the task manager OSS 22-2, a message to initiate a quantum process from the QIF 36-N (FIG. 4, block 5008).

Figure 5:
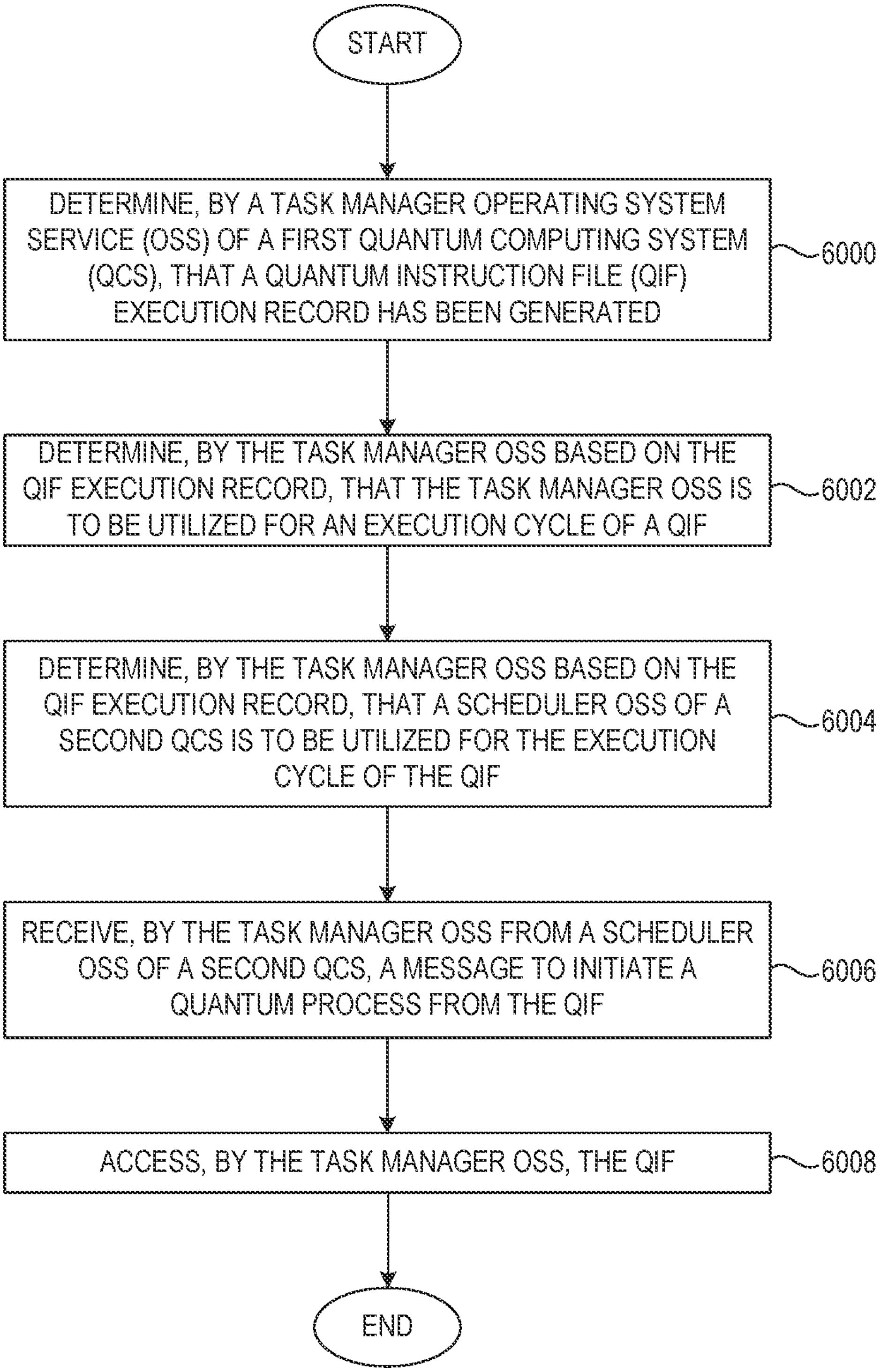
FIG. 5 is a flowchart of a method for a task manager OSS according to one implementation.

FIG. 5 is a flowchart of a method for a task manager OSS according to one implementation. FIG. 5 will be discussed in conjunction with FIGS. 3A-3C. The task manager OSS 22-2 determines that the QER 46-M has been generated (FIG. 5, block 6000). The task manager OSS 22-2 determines, based on the QER 46-M, that the task manager OSS 22-2 is to be utilized for an execution cycle of the QIF 36-N (FIG. 5, block 6002). The task manager OSS 22-2 determines, based on the QER 46-M, that the scheduler OSS 24-3 of the QCS 12-3 is to be utilized for the execution cycle of the QIF 36-N (FIG. 5, block 6004). The task manager OSS 22-2 receives, from the scheduler OSS 24-3, a message to initiate a quantum process from the QIF 36-N (FIG. 5, block 6006). The task manager OSS 22-2 accesses the QIF 36-N (FIG. 5, block 6008).

Figure 6:
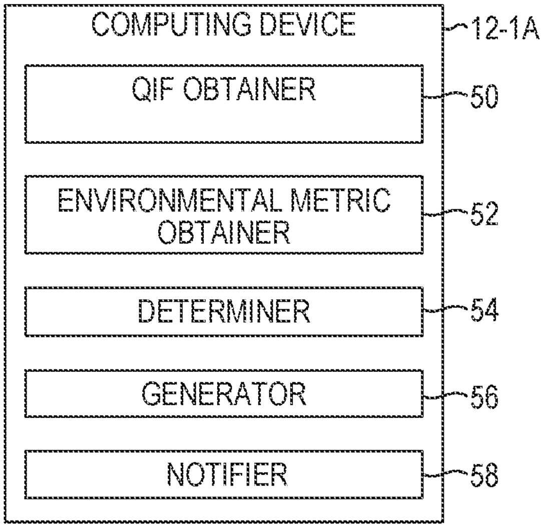
FIG. 6 is a block diagram of a computing device suitable for implementing aspects illustrated in FIG. 1 according to one implementation.

FIG. 6 is a block diagram of a computing device 12-1A according to another implementation. The computing device 12-1A implements identical functionality as that described above with regard to the computing device 12-1. The computing device 12-1A includes a QIF obtainer 50 to obtain a QIF comprising programming instructions operable to manipulate a qubit. The QIF obtainer 50 may comprise executable software instructions configured to program a processor device to implement the functionality of obtaining a QIF comprising programming instructions operable to manipulate a qubit, may comprise circuitry including, by way of non-limiting example, an application-specific integrated circuit (ASIC), field-programmable gate array (FPGA), or may comprise a combination of executable software instructions and circuitry. The QIF obtainer 50 may obtain a QIF file by receiving the QIF file from a computing device that requests that a quantum process be initiated from the QIF file. In another implementation, the QIF obtainer 50 may obtain a QIF file by, for example, obtaining the QIF file from a QIF repository.

The computing device 12-1A includes an environmental metric obtainer 52 to obtain, from each respective QCS 12 of the plurality of QCSs 12-1-12-3 communicatively coupled to one another, real-time environmental metrics of the respective QCS 12. The environmental metric obtainer 52 may comprise executable software instructions configured to program a processor device to implement the functionality of obtaining, from each respective QCS 12 of the plurality of QCSs 12-1-12-3 communicatively coupled to one another, real-time environmental metrics of the respective QCS 12, may comprise circuitry including, by way of non-limiting example, an application-specific integrated circuit (ASIC), field-programmable gate array (FPGA), or may comprise a combination of executable software instructions and circuitry. In some implementations the environmental metric obtainer 52 may obtain the environmental metrics by requesting the environmental metrics from the QCSs 12-1-12-3.

The computing device 12-1A includes a determiner 54 to, based on the real-time environmental metrics, determine that a first OSS implemented by an OS of a first QCS 12 of the plurality of QCSs 12-1-12-3 is to be utilized for an execution cycle of a QIF, and a second OSS implemented by an OS of a second QCS 12 of the plurality of QCSs 12-1-12-3 is to be utilized for the execution cycle of the QIF. The determiner 54 may comprise executable software instructions configured to program a processor device to implement the functionality of determining that a first OSS implemented by an OS of a first QCS 12 of the plurality of QCSs 12-1-12-3 is to be utilized for an execution cycle of a QIF, and a second OSS implemented by an OS of a second QCS 12 of the plurality of QCSs 12-1-12-3 is to be utilized for the execution cycle of the QIF, may comprise circuitry including, by way of non-limiting example, an application-specific integrated circuit (ASIC), field-programmable gate array (FPGA), or may comprise a combination of executable software instructions and circuitry.

The computing device 12-1A includes a generator 56 to generate a QIF execution record that indicates that the first OSS and the second OSS is to be utilized for the execution cycle of the QIF. The generator 56 may comprise executable software instructions configured to program a processor device to implement the functionality of generating a QIF execution record that indicates that the first OSS and the second OSS is to be utilized for the execution cycle of the QIF, may comprise circuitry including, by way of non-limiting example, an application-specific integrated circuit (ASIC), field-programmable gate array (FPGA), or may comprise a combination of executable software instructions and circuitry.

The computing device 12-1A includes a notifier 58 to cause the first QCS and the second QCS to be notified of the generation of the first QIF execution record. The notifier 58 may comprise executable software instructions configured to program a processor device to implement the functionality of causing the first QCS and the second QCS to be notified of the generation of the first QIF execution record, may comprise circuitry including, by way of non-limiting example, an application-specific integrated circuit (ASIC), field-programmable gate array (FPGA), or may comprise a combination of executable software instructions and circuitry.

Figure 7:
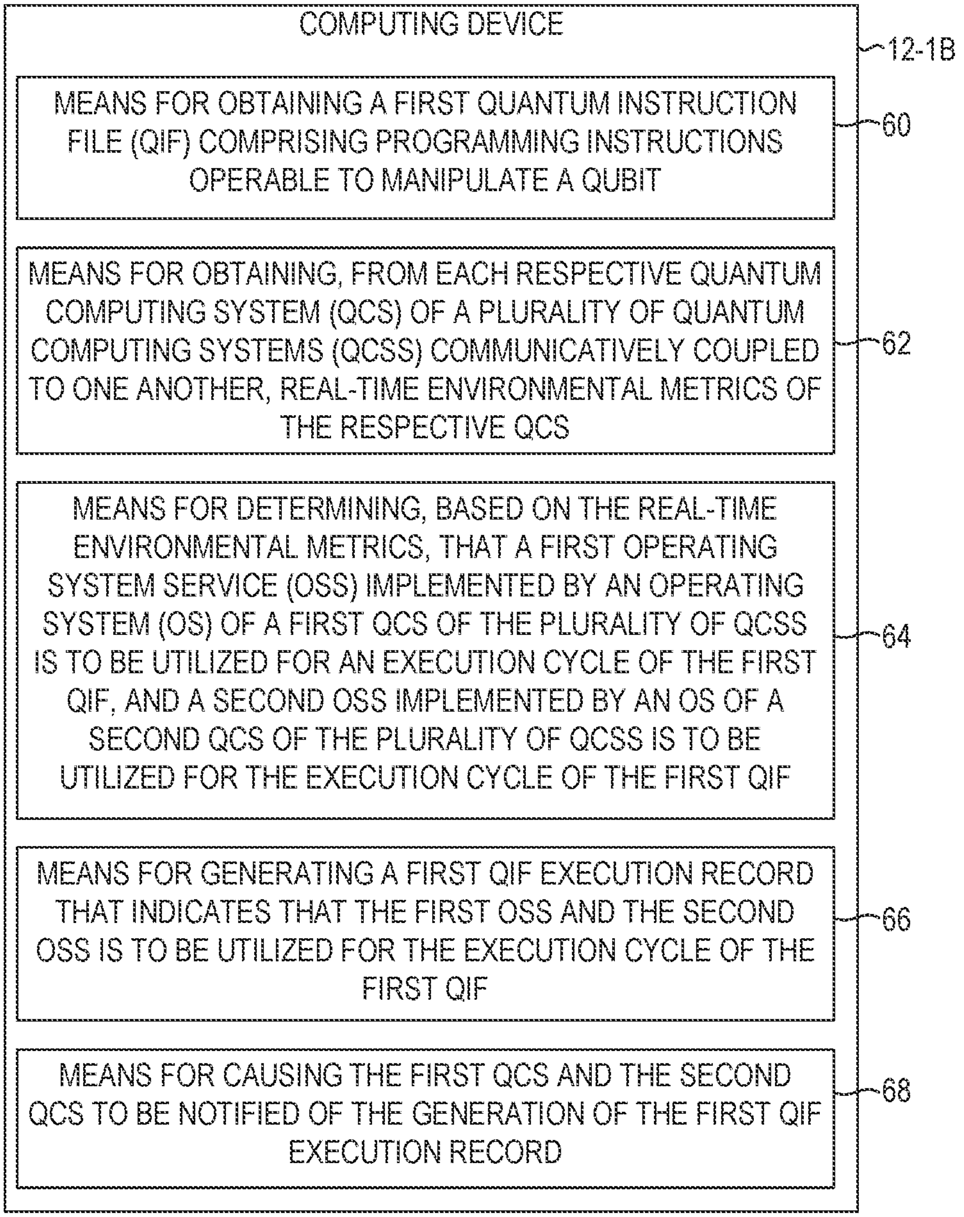
FIG. 7 is a block diagram of a computing device suitable for implementing aspects illustrated in FIG. 1 according to another implementation.

FIG. 7 is a block diagram of a computing device 12-1B according to additional implementations. The computing device 12-1B implements identical functionality as that described above with regard to the computing device 12-1. In this implementation, the computing device 12-1B includes a means 60 for obtaining a first quantum instruction file (QIF) comprising programming instructions operable to manipulate a qubit. The means 60 may be implemented in any number of manners, including, for example, via the QIF obtainer 50 illustrated in FIG. 6. The computing device 12-1B includes a means 62 for obtaining, from each respective quantum computing system (QCS) of a plurality of quantum computing systems (QCSs) communicatively coupled to one another, real-time environmental metrics of the respective QCS. The means 62 may be implemented in any number of manners, including, for example, via the environmental metric obtainer 52 illustrated in FIG. 6. The computing device 12-1B includes a means 64 for determining, based on the real-time environmental metrics, that a first operating system service (OSS) implemented by an operating system (OS) of a first QCS of the plurality of QCSs is to be utilized for an execution cycle of the first QIF, and a second OSS implemented by an OS of a second QCS of the plurality of QCSs is to be utilized for the execution cycle of the first QIF. The means 64 may be implemented in any number of manners, including, for example, via the determiner 54 illustrated in FIG. 6. The computing device 12-1B includes a means 66 for generating a first QIF execution record that indicates that the first OSS and the second OSS is to be utilized for the execution cycle of the first QIF. The means 66 may be implemented in any number of manners, including, for example, via the generator 56 illustrated in FIG. 6. The computing device 12-1B includes a means 68 for causing the first QCS and the second QCS to be notified of the generation of the first QIF execution record. The means 68 may be implemented in any number of manners, including, for example, via the notifier 58 illustrated in FIG. 6.

Figure 8:
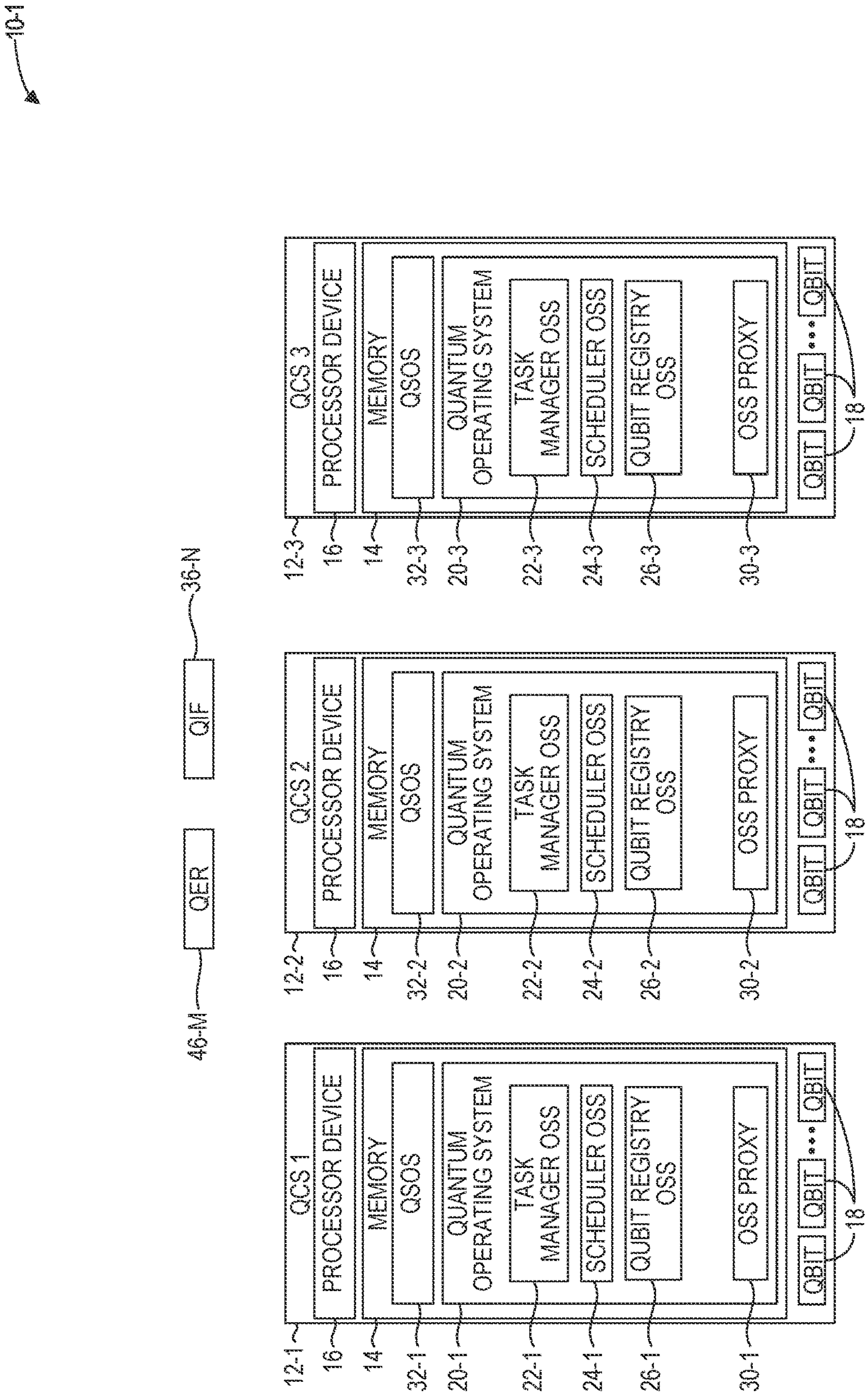
FIG. 8 is a simplified block diagram of the environment illustrated in FIG. 1 according to one implementation.

FIG. 8 is block diagram of an environment 10-1 which is a simplified block diagram of the environment 10 illustrated in FIG. 1 according to one implementation. The environment 10-1 includes the computing device 12-1, the memory 14 and the and processor device 16. The processor device 16 is coupled to the memory 14 and is to obtain the QIF 36-N comprising programming instructions operable to manipulate a qubit 18. The processor device 16 is further to obtain, from each respective QCS 12 of the plurality of QCSs 12-1-12-3 communicatively coupled to one another, real-time environmental metrics of the respective QCS 12. The processor device 16 is further to determine, based on the real-time environmental metrics, that a first OSS implemented by an OS of a first QCS 12 of the plurality of QCSs 12-1-12-3 is to be utilized for an execution cycle of the QIF 36-N, and a second OSS implemented by an OS of a second QCS 12 of the plurality of QCSs 12-1-12-3 is to be utilized for the execution cycle of the QIF 36-N. The processor device 16 is further to generate the QER 46-M that indicates that the first OSS and the second OSS are to be utilized for the execution cycle of the QIF 36-N. The processor device 16 is further to cause the first QCS 12 and the second QCS 12 to be notified of the generation of the QER 46-M.

Figure 9:
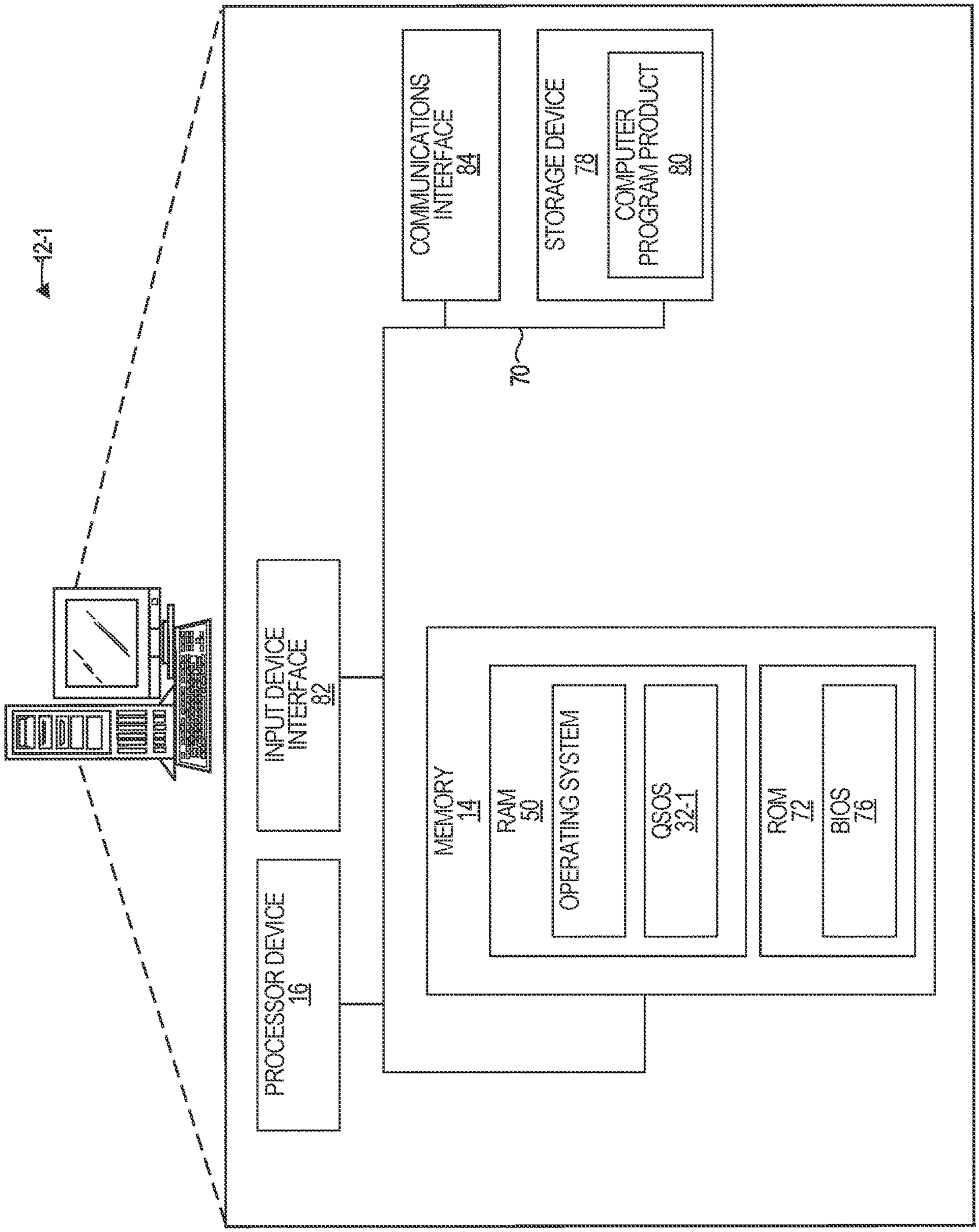
FIG. 9 is a block diagram of a quantum computing system suitable for implementing examples according to one example.

FIG. 9 is a block diagram of the QCS 12-1 suitable for implementing examples according to one example. The QCS 12-1 may comprise any computing or electronic device capable of including firmware, hardware, and/or executing software instructions to implement the functionality described herein, such as a computer server, a quantum computing system, or the like. The QCS 12-1 includes the processor device 16, the system memory 14, and a system bus 70. The system bus 70 provides an interface for system components including, but not limited to, the system memory 14 and the processor device 16. The processor device 16 can be any commercially available or proprietary processor device.

The system bus 70 may be any of several types of bus structures that may further interconnect to a memory bus (with or without a memory controller), a peripheral bus, and/or a local bus using any of a variety of commercially available bus architectures. The system memory 14 may include non-volatile memory 72 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 72 and can include the basic routines that help to transfer information between elements within the QCS 12-1. The volatile memory 74 may also include a high-speed RAM, such as static RAM, for caching data.

The QCS 12-1 may further include or be coupled to a non-transitory computer-readable storage medium such as a storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like.

A number of modules can be stored in the storage device 78 and in the volatile memory 74, including an operating system and one or more program modules, such as the QSOS 32-1, which may implement the functionality described herein in whole or in part. All or a portion of the examples may be implemented as a computer program product 80 stored on a transitory or non-transitory computer-usable or computer-readable storage medium, such as the storage device 78, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the QSOS 32-1 in the volatile memory 74, may serve as a controller, or control system, for the QCS 12-1 that is to implement the functionality described herein.

An operator, such as the user 38, may also be able to enter one or more configuration commands through a keyboard (not illustrated), a pointing device such as a mouse (not illustrated), or a touch-sensitive surface such as a display device. Such input devices may be connected to the processor device 16 through an input device interface 82 that is coupled to the system bus 70 but can be connected by other interfaces such as a parallel port, an Institute of Electrical and Electronic Engineers (IEEE) 1394 serial port, a Universal Serial Bus (USB) port, an IR interface, and the like. The QCS 12-1 may also include a communications interface 84 suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a computing device comprising: means for obtaining a first quantum instruction file (QIF) comprising programming instructions operable to manipulate a qubit; means for obtaining, from each respective quantum computing system (QCS) of a plurality of quantum computing systems (QCSs) communicatively coupled to one another, real-time environmental metrics of the respective QCS; means for determining, based on the real-time environmental metrics, that a first operating system service (OSS) implemented by an operating system (OS) of a first QCS of the plurality of QCSs is to be utilized for an execution cycle of the first QIF, and a second OSS implemented by an OS of a second QCS of the plurality of QCSs is to be utilized for the execution cycle of the first QIF; means for generating a first QIF execution record that indicates that the first OSS and the second OSS is to be utilized for the execution cycle of the first QIF; and means for causing the first QCS and the second QCS to be notified of the generation of the first QIF execution record.

Example 2 is the computing device of example 1 further comprising: means for determining, based on an analysis of the first QIF, a resource that will be needed by the quantum process initiated from the first QIF; means for obtaining, from each respective QCS of the plurality of QCSs, resource information that identifies an availability status of a resource on the respective QCS; means for determining, based on the resource information, that the resource is to be provided by a third QCS; and means for storing, in the first QIF execution record, information that identifies the resource is to be provided by the third QCS.

Example 3 is a computing device comprising: a quantum instruction file (QIF) obtainer to obtain a first QIF comprising programming instructions operable to manipulate a qubit; an environmental metric obtainer to obtain, from each respective quantum computing system (QCS) of a plurality of quantum computing systems (QCSs) communicatively coupled to one another, real-time environmental metrics of the respective QCS; a determiner to, based on the real-time environmental metrics, determine that a first operating system service (OSS) implemented by an operating system (OS) of a first QCS of the plurality of QCSs is to be utilized for an execution cycle of the first QIF, and a second OSS implemented by an OS of a second QCS of the plurality of QCSs is to be utilized for the execution cycle of the first QIF; a generator to, generate a first QIF execution record that indicates that the first OSS and the second OSS is to be utilized for the execution cycle of the first QIF; and a notifier to cause the first QCS and the second QCS to be notified of the generation of the first QIF execution record.

Example 4 is the computing device of example 3 further comprising: a resource determiner to, based on an analysis of the first QIF, determined a resource that will be needed by the quantum process initiated from the first QIF; a resource information obtainer to obtain, from each respective QCS of the plurality of QCSs, resource information that identifies an availability status of a resource on the respective QCS; a QCS determiner to determine, based on the resource information, that the resource is to be provided by a third QCS; and a storer to store, in the first QIF execution record, information that identifies the resource is to be provided by the third QCS.

Example 5 is a method comprising: determining, by a scheduler operating system service (OSS) of a first quantum computing system (QCS), that a quantum instruction file (QIF) execution record has been generated; determining, by the scheduler OSS based on the QIF execution record, that the scheduler OSS is to be utilized for an execution cycle of a QIF; determining, by the scheduler OSS based on the QIF execution record, that a task manager OSS of a second QCS is to be utilized for the execution cycle of the QIF; obtaining, by the scheduler OSS from the second QCS, environmental metrics of the second QCS; and based on an analysis of the environmental metrics of the second QCS, sending, by the scheduler OSS to the task manager OSS, a message to initiate a quantum process from the QIF.

Example 6 is the method of example 5 wherein the environmental metrics comprise one or more of a current temperature profile of the second QCS, a current noise profile of the second QCS, a processor utilization of the second QCS, or a memory utilization of the second QCS.

Example 7 is the method of example 6 further comprising: prior to sending, by the scheduler OSS to the task manager OSS, the message to initiate the quantum process from the QIF, determining, based on the environmental metrics, that the second QCS should not initiate the quantum process from the QIF at a current time; subsequently, obtaining, by the scheduler OSS from the second QCS, the environmental metrics of the second QCS; and based on an analysis of the environmental metrics of the second QCS, sending, by the scheduler OSS to the task manager OSS, the message to initiate a quantum process from the QIF.

Example 8 is a quantum computing system comprising: a memory; and a processor device coupled to the memory to: determine, by a scheduler operating system service (OSS) of the quantum computing system (QCS), that a quantum instruction file (QIF) execution record has been generated; determine, by the scheduler OSS based on the QIF execution record, that the scheduler OSS is to be utilized for an execution cycle of a QIF; determine, by the scheduler OSS based on the QIF execution record, that a task manager OSS of a second QCS is to be utilized for the execution cycle of the QIF; obtain, by the scheduler OSS from the second QCS, environmental metrics of the second QCS; based on an analysis of the environmental metrics of the second QCS, send, by the scheduler OSS to the task manager OSS, a message to initiate a quantum process from the QIF.

Example 9 is the quantum computing system of example 8 wherein the environmental metrics comprise one or more of a current temperature profile of the second QCS, a current noise profile of the second QCS, a processor utilization of the second QCS, or a memory utilization of the second QCS.

Example 10 is the quantum computing system of example 8 wherein the processor device is further to: prior to sending, by the scheduler OSS to the task manager OSS, the message to initiate the quantum process from the QIF, determine, based on the environmental metrics, that the second QCS should not initiate the quantum process from the QIF at a current time; subsequently, obtain, by the scheduler OSS from the second QCS, the environmental metrics of the second QCS; and based on an analysis of the environmental metrics of the second QCS, send, by the scheduler OSS to the task manager OSS, the message to initiate a quantum process from the QIF.

Example 11 is a method comprising: determining, by a task manager operating system service (OSS) of a first quantum computing system (QCS), that a quantum instruction file (QIF) execution record has been generated; determining, by the task manager OSS based on the QIF execution record, that the task manager OSS is to be utilized for an execution cycle of a QIF; determining, by the task manager OSS based on the QIF execution record, that a scheduler OSS of a second QCS is to be utilized for the execution cycle of the QIF; receiving, by the task manager OSS from a scheduler OSS of a second QCS, a message to initiate a quantum process from the QIF; accessing, by the task manager OSS, the QIF.

Example 12 is the method of example 11 further comprising: determining, by the task manager OSS based on the QIF execution record, that the quantum process will need a determined number of qubits; determining, by the task manager OSS based on the QIF execution record, that a qubit registry OSS of a third QCS is to be utilized for the execution cycle of a QIF; sending, by the task manager OSS to the qubit registry OSS, a request to allocate the determined number of qubits; receiving, by the task manager OSS from the qubit registry OSS, qubit addresses of the determined number of qubits.

Example 13 is the method of example 12 further comprising: initiating, by the task manager OSS, the quantum process; and providing, by the task manager OSS to the quantum process, the qubit addresses of the determined number of qubits.

Example 14 is the method of example 13 further comprising: determining, by the task manager OSS based on the QIF execution record, that an external process will be needed by the quantum process; accessing, by the task manager OSS, a QIF file of the external process; and initiating, by the task manager OSS, the external process.

Example 15 is a computing device comprising: a memory; and a processor device coupled to the memory to: determine, by a task manager operating system service (OSS) of a first quantum computing system (QCS), that a quantum instruction file (QIF) execution record has been generated; determine, by the task manager OSS based on the QIF execution record, that the task manager OSS is to be utilized for an execution cycle of a QIF; determine, by the task manager OSS based on the QIF execution record, that a scheduler OSS of a second QCS is to be utilized for the execution cycle of the QIF; receive, by the task manager OSS from a scheduler OSS of a second QCS, a message to initiate a quantum process from the QIF; and access, by the task manager OSS, the QIF.

Example 16 is the computing device of example 15 wherein the processor device is further to: determine, by the task manager OSS based on the QIF execution record, that the quantum process will need a determined number of qubits; determine, by the task manager OSS based on the QIF execution record, that a qubit registry OSS of a third QCS is to be utilized for the execution cycle of a QIF; send, by the task manager OSS to the qubit registry OSS, a request to allocate the determined number of qubits; receive, by the task manager OSS from the qubit registry OSS, qubit addresses of the determined number of qubits.

Example 17 is the computing device of example 16 wherein the processor device is further to: initiate, by the task manager OSS, the quantum process; and provide, by the task manager OSS to the quantum process, the qubit addresses of the determined number of qubits.

Example 18 is the computing device of example 17 wherein the processor device is further to: determine, by the task manager OSS based on the QIF execution record, that an external process will be needed by the quantum process; access, by the task manager OSS, a QIF file of the external process; and initiate, by the task manager OSS, the external process.

Individuals will recognize improvements and modifications to the preferred examples of the disclosure. All such improvements and modifications are considered within the scope of the concepts disclosed herein and the claims that follow.

What is claimed is:

1. A method comprising:

obtaining, by a computing device, a first quantum instruction file (QIF) comprising programming instructions operable to manipulate a qubit;

obtaining, by the computing device from each respective quantum computing system (QCS) of a plurality of QCSs communicatively coupled to one another, real-time environmental metrics of the respective QCS, each respective QCS comprising a respective qubit;

determining, by the computing device based on the real-time environmental metrics, that a first operating system service (OSS) implemented by an operating system (OS) of a first QCS of the plurality of QCSs is to be assigned to service a first portion of an execution cycle of the first QIF, and a second OSS implemented by an OS of a second QCS of the plurality of QCSs is to be assigned to service a second portion of the execution cycle of the first QIF;

generating, by the computing device, a first QIF execution record that assigns the first OSS and the second OSS to service the execution cycle of the first QIF; and causing, by the computing device, the first OSS to service the first portion of the execution cycle and the second OSS to service the second portion of the execution cycle, wherein causing the first OSS to service the first portion of the execution cycle and the second OSS to service the second portion of the execution cycle comprises:

causing, by the computing device, the first QCS and the second QCS to be notified of the generation of the first QIF execution record.

2. The method of claim 1 wherein causing, by the computing device, the first QCS and the second QCS to be notified of the generation of the first QIF execution record comprises storing, by the computing device, the first QIF execution record in a QIF execution repository comprising a plurality of QIF execution records.

3. The method of claim 1 wherein causing, by the computing device, the first QCS and the second QCS to be notified of the generation of the first QIF execution record comprises sending, by the computing device, the first QIF execution record to the first QCS and the second QCS.

4. The method of claim 1 wherein the computing device is a third QCS of the plurality of QCSs.

5. The method of claim 1 wherein the first OSS comprises a scheduler OSS operable to schedule the first QIF for future execution and the second OSS comprises a task manager OSS operable to initiate a quantum process from the first QIF, and further comprising:

determining, by the scheduler OSS, that the first QIF execution record identifies a predetermined time that the quantum process is to be initiated from the first QIF; determining, by the scheduler OSS, that the predetermined time has arrived; and in response to determining that the predetermined time has arrived, sending a message to the task manager OSS on the second QCS to initiate the quantum process from the first QIF.

6. The method of claim 5 further comprising:

receiving, by the task manager OSS on the second QCS, the message;

accessing, by the task manager OSS, the first QIF execution record;

accessing, by the task manager OSS, the first QIF; and initiating, by the task manager OSS on the second QCS, the quantum process from the first QIF.

7. The method of claim 1 further comprising:

determining, by the computing device based on an analysis of the first QIF, a resource that will be needed by a quantum process initiated from the first QIF;

obtaining, by the computing device from each respective QCS of the plurality of QCSs, resource information that identifies an availability status of a resource on the respective QCS;

determining, based on the resource information, that the resource that will be needed by the quantum process is to be provided by a third QCS; and storing, in the first QIF execution record, information that indicates the resource is to be provided by the third QCS.

8. The method of claim 7 wherein determining, based on the analysis of the first QIF, the resource that will be needed by the quantum process initiated from the first QIF further comprises:

parsing the first QIF and determining that instructions in the first QIF invoke an external process, and wherein the resource that will be needed by the quantum process comprises the external process.

9. The method of claim 7 wherein determining, based on the analysis of the first QIF, the resource that will be needed by the quantum process further comprises:

parsing the first QIF and determining that a determined quantity of qubits will be needed by the quantum process initiated from the first QIF, and wherein the resource that will be needed by the quantum process comprises the determined quantity of qubits.

10. The method of claim 7 wherein determining, based on the analysis of the first QIF, the resource that will be needed by the quantum process further comprises:

parsing the first QIF and identifying a non-executable comment annotation that complies with a predetermined syntax and that identifies the resource that will be needed by the quantum process initiated from the first QIF.

11. The method of claim 1 wherein the real-time environmental metrics comprise one or more of a number of available qubits on each respective QCS, a current temperature profile of each respective QCS, a current noise profile of each respective QCS, a type of qubit implemented by each respective QCS, an error correction service offered by each respective QCS, a processor utilization of each respective QCS, or a memory utilization of each respective QCS.

12. The method of claim 1 wherein the first OSS and the second OSS each comprise one of a task manager OSS, a scheduler OSS, or a qubit registry OSS, and the second OSS is different from the first OSS.

13. The method of claim 1 wherein the first OSS comprises a task manager OSS operable to initiate a quantum process from the first QIF, and wherein determining, by the computing device based on the real-time environmental metrics, that the first OSS implemented by the first QCS of the plurality of QCSs is to be assigned to service the first portion of the execution cycle of the first QIF, further comprises:

determining, by the computing device based on the real-time environmental metrics, that the first QCS has a lower processor utilization than the second QCS; and in response to determining that the first QCS has the lower processor utilization than the second QCS, determining that the task manager OSS implemented by the first QCS is to be assigned to service the first portion of the execution cycle of the first QIF.

14. The method of claim 1 wherein the first OSS comprises a task manager OSS operable to initiate a quantum process from the first QIF, and wherein determining, by the computing device based on the real-time environmental metrics, that the first OSS implemented by the first QCS of the plurality of QCSs is to be assigned to service the first portion of the execution cycle of the first QIF, further comprises:

determining, by the computing device based on the real-time environmental metrics, that the first QCS has a preferable heat profile with respect to a heat profile of the second QCS; and in response to determining that the first QCS has the preferable heat profile, determining that the task manager OSS implemented by the first QCS is to be assigned to service the first portion of the execution cycle of the first QIF.

15. The method of claim 1 wherein the first OSS comprises a scheduler OSS operable to schedule the first QIF for execution, and wherein determining, by the computing device based on the real-time environmental metrics, that the first OSS implemented by the first QCS of the plurality of QCSs is to be assigned to service the first portion of the execution cycle of the first QIF, further comprises:

determining, by the computing device based on the real-time environmental metrics, that the scheduler OSS of the first QCS has a fewer number of QIFs scheduled for execution than the scheduler OSS of the second QCS; and in response to determining that the scheduler OSS of the first QCS has the fewer number of QIFs scheduled for execution, determining that the scheduler OSS implemented by the first QCS is to be assigned to service the first portion of the execution cycle of the first QIF.

16. The method of claim 1 wherein the first OSS comprises a qubit registry OSS operable to allocate qubits for quantum processes, and wherein determining, by the computing device based on the real-time environmental metrics, that the first OSS implemented by the first QCS of the plurality of QCSs is to be assigned to service the first portion of the execution cycle of the first QIF, further comprises:

determining, by the computing device based on the real-time environmental metrics, that the qubit registry OSS of the first QCS is identified in a fewer number of QIF execution records than any other qubit registry OSS of the plurality of QCSs; and in response to determining that the qubit registry OSS of the first QCS is identified in a fewer number of QIF execution records than any other qubit registry OSS of the plurality of QCSs, determining that the qubit registry OSS implemented by the first QCS is to be assigned to service the first portion of the execution cycle of the first QIF.

17. The method of claim 1 wherein the computing device comprises a third QCS of the plurality of QCSs, and further comprising:

determining, by the third QCS, that a second QIF execution record has been generated related to an execution cycle of a second QIF;

accessing, by the third QCS, the second QIF execution record;

determining, by the third QCS, that the second QIF execution record identifies a scheduler OSS of the third QCS as being the scheduler OSS for the execution cycle of the second QIF; and scheduling, by the scheduler OSS of the third QCS, the second QIF for execution.

18. A computing device, comprising:

a memory; and a processor device coupled to the memory to:

obtain a first quantum instruction file (QIF) comprising programming instructions operable to manipulate a qubit;

obtain, from each respective quantum computing system (QCS) of a plurality of QCSs communicatively coupled to one another, real-time environmental metrics of the respective QCS, each respective QCS comprising a respective qubit;

determine, based on the real-time environmental metrics, that a first operating system service (OSS) implemented by an operating system (OS) of a first QCS of the plurality of QCSs is to be assigned to service a first portion of an execution cycle of the first QIF, and a second OSS implemented by an OS of a second QCS of the plurality of QCSs is to be assigned to service a second portion of the execution cycle of the first QIF;

generate a first QIF execution record that assigns the first OSS and the second OSS to service the execution cycle of the first QIF; and cause the first OSS to service the first portion of the execution cycle and the second OSS to service the second portion of the execution cycle, wherein, to cause the first OSS to service the first portion of the execution cycle and the second OSS to service e the second portion of the execution cycle, the processor device is further to:

cause the first QCS and the second QCS to be notified of the generation of the first QIF execution record.

19. The computing device of claim 18 wherein the processor device is further to:

determine, based on an analysis of the first QIF, a resource that will be needed by a quantum process initiated from the first QIF;

obtain, from each respective QCS of the plurality of QCSs, resource information that identifies an availability status of a resource on the respective QCS;

determine, based on the resource information, that the resource that will be needed by the quantum process is to be provided by a third QCS; and store, in the first QIF execution record, information that indicates the resource is to be provided by the third QCS.

20. A non-transitory computer-readable storage medium that includes executable instructions to cause a processor device to:

obtain a first quantum instruction file (QIF) comprising programming instructions operable to manipulate a qubit;

obtain, from each respective quantum computing system (QCS) of a plurality of QCSs communicatively coupled to one another, real-time environmental metrics of the respective QCS, each respective QCS comprising a respective qubit;

determine, based on the real-time environmental metrics, that a first operating system service (OSS) implemented by an operating system (OS) of a first QCS of the plurality of QCSs is to be assigned to service a first portion of an execution cycle of the first QIF, and a second OSS implemented by an OS of a second QCS of the plurality of QCSs is to be assigned to service a second portion of the execution cycle of the first QIF;

generate a first QIF execution record that assigns the first OSS and the second OSS to service the execution cycle of the first QIF; and cause the first OSS to service the first portion of the execution cycle and the second OSS to service the second portion of the execution cycle, wherein, to cause the first OSS to service the first portion of the execution cycle and the second OSS to service the second portion of the execution cycle, the executable instructions further cause the processor device to:

cause the first QCS and the second QCS to be notified of the generation of the first QIF execution record.

* * * * *